United States Patent
Zhang et al.

(10) Patent No.: US 10,698,559 B2
(45) Date of Patent: Jun. 30, 2020

(54) METHOD AND APPARATUS FOR DISPLAYING CONTENT ON SAME SCREEN, AND TERMINAL DEVICE

(71) Applicant: Tencent Technology (Shenzhen) Company Limited, Shenzhen, Guangdong (CN)

(72) Inventors: Kunjie Zhang, Shenzhen (CN); Chaoqun Jin, Shenzhen (CN); Wenshuo Zhou, Shenzhen (CN); Xiaonan Feng, Shenzhen (CN); Guangwen Zhong, Shenzhen (CN); Can Li, Shenzhen (CN); Liping Zhou, Shenzhen (CN); Cheng Guo, Shenzhen (CN); Wei Xu, Shenzhen (CN); Xiao Song, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 78 days.

(21) Appl. No.: 15/695,441

(22) Filed: Sep. 5, 2017

(65) Prior Publication Data

US 2017/0364210 A1    Dec. 21, 2017

Related U.S. Application Data

(63) Continuation of application No. PCT/CN2016/080158, filed on Apr. 25, 2016.

(30) Foreign Application Priority Data

May 20, 2015 (CN) .......................... 2015 1 0259367

(51) Int. Cl.
*G06F 3/0481* (2013.01)
*H04N 19/156* (2014.01)
(Continued)

(52) U.S. Cl.
CPC ............ *G06F 3/0481* (2013.01); *A63F 13/25* (2014.09); *A63F 13/35* (2014.09); *A63F 13/53* (2014.09);
(Continued)

(58) Field of Classification Search
CPC ......... H04N 5/445453; H04N 21/4316; H04N 21/4858; G06F 3/0484; G06F 3/0482; G06F 3/04845
See application file for complete search history.

(56) References Cited

U.S. PATENT DOCUMENTS 5,915,085 A    6/1999  Koved
5,946,487 A *  8/1999  Dangelo ............... G06F 9/4843
                                                    717/148

(Continued)

FOREIGN PATENT DOCUMENTS

CN    103957447 A    7/2014
CN    104065814 A    9/2014

(Continued)

OTHER PUBLICATIONS

Office Action regarding Korean Patent Application No. 10-2017-7015904, dated Jun. 21, 2018. Translation provided by Unitalen Attorneys at Law.

(Continued)

*Primary Examiner* — Jennifer N To
*Assistant Examiner* — Eric J Yoon
(74) *Attorney, Agent, or Firm* — Harness, Dickey & Pierce, P.L.C.

(57) ABSTRACT

Provided are a method and an apparatus for displaying content on a same screen and a terminal device. The method includes: displaying an application interface of an application on a display apparatus, and displaying a floating region on the same screen as the application interface; setting a
(Continued)

content loader corresponding to the floating region; determining display content of the floating region; and invoking the content loader to load the determined display content to the floating region for display.

17 Claims, 11 Drawing Sheets

(51) Int. Cl.
    *A63F 13/53*     (2014.01)
    *H04N 19/59*     (2014.01)
    *G06F 9/445*     (2018.01)
    *G06F 9/46*     (2006.01)
    *A63F 13/25*     (2014.01)
    *A63F 13/35*     (2014.01)
    *G06F 9/451*     (2018.01)
    *G06F 8/61*     (2018.01)
    *G06F 3/0484*     (2013.01)
    *G06T 9/00*     (2006.01)

(52) U.S. Cl.
    CPC .......... *G06F 9/44526* (2013.01); *G06F 9/451* (2018.02); *G06F 9/46* (2013.01); *H04N 19/156* (2014.11); *H04N 19/59* (2014.11); *G06F 3/04845* (2013.01); *G06F 8/61* (2013.01); *G06F 2203/04803* (2013.01); *G06T 9/00* (2013.01)

(56) References Cited

U.S. PATENT DOCUMENTS

| | | | |
|---|---|---|---|
| 7,870,190 B2 | 1/2011 | Takakura et al. | |
| 8,321,888 B2 | 11/2012 | Epstein et al. | |
| 8,438,222 B2 | 5/2013 | Takakura et al. | |
| 8,645,860 B2 * | 2/2014 | Brenneman | G06F 16/9577 715/800 |
| 9,898,155 B2 | 2/2018 | Kim et al. | |
| 2007/0282941 A1 | 12/2007 | Takakura et al. | |
| 2010/0180292 A1 * | 7/2010 | Epstein | H04N 5/44513 725/32 |
| 2011/0087727 A1 | 4/2011 | Takakura et al. | |
| 2011/0320274 A1 | 12/2011 | Patil | |
| 2012/0110070 A1 | 5/2012 | Takakura et al. | |
| 2013/0305184 A1 | 11/2013 | Kim et al. | |
| 2014/0237420 A1 | 8/2014 | Song et al. | |
| 2014/0331174 A1 | 11/2014 | Wen et al. | |
| 2015/0046812 A1 * | 2/2015 | Darby | G06Q 30/0277 715/716 |
| 2016/0086566 A1 * | 3/2016 | Zhu | G06F 16/9577 345/428 |
| 2016/0182941 A1 * | 6/2016 | Crabtree | H04N 21/23106 725/115 |

FOREIGN PATENT DOCUMENTS

| | | |
|---|---|---|
| CN | 104133616 A | 11/2014 |
| CN | 104346216 A | 2/2015 |
| CN | 104808907 A | 7/2015 |
| JP | 2003524843 A | 8/2003 |
| JP | 2007323544 A | 12/2007 |
| JP | 2012515506 A | 7/2012 |
| JP | 2012519895 A | 8/2012 |
| KR | 20130126430 A | 11/2013 |
| KR | 20140131863 A | 11/2014 |
| WO | WO-0161484 A2 | 8/2001 |

OTHER PUBLICATIONS

Second Korean Office Action regarding Korean Patent Application No. 10-2017-7015904 dated Dec. 21, 2018. English translation provided by Unitalen Attorneys at Law.

Office Action regarding Japanese Patent Application No. 2017-534306, dated May 29, 2018. Translation provided by Unitalen Attorneys at Law.

International Search Report (English & Chinese) and Written Opinion (Chinese) regarding Application No. PCT/CN2016/080158, dated Jul. 22, 2016, Haidian District, Beijing.

Second Japanese Office Action regarding Application No. 2017-534306 dated Jan. 22, 2019. English translation provided by Unitalen Attorneys at Law.

* cited by examiner

METHOD AND APPARATUS FOR DISPLAYING CONTENT ON SAME SCREEN, AND TERMINAL DEVICE

The present application is a continuation of International Patent Application No. PCT/CN2016/080158, filed on Apr. 25, 2016, which claims the priority to Chinese Patent Application No. 201510259367.X, titled "METHOD AND APPARATUS FOR DISPLAYING CONTENT ON SAME SCREEN, AND TERMINAL DEVICE", filed on May 20, 2015 with the State Intellectual Property Office of the People's Republic of China, both of which are incorporated herein by reference in their entireties.

TECHNICAL FIELD

The present disclosure relates to the field of content display technology, and in particular to a method and an apparatus for displaying content on a same screen and a terminal device.

BACKGROUND

With the popularization of intelligent operating systems such as Android and IOS, more and more applications are loaded on a terminal device. However, at present, most of terminal devices based on the intelligent operating systems do not support multi-window tasks on a same interface, and the terminal devices based on the intelligent operating systems cannot display multi-contents on a same screen as PC (personal computer). Therefore, searching for a way to realize the multi-contents display on a same screen in a terminal device based on an intelligent operating system has become a research hotspot at present.

A current method for displaying content on a same screen mainly uses a floating window technology. A floating window unrelated to application content of an application is displayed on an application interface of the application currently run by the terminal device, and some functions are achieved on the application interface through the floating window. Specifically, when running the application, the terminal device displays the application interface of the application run by the terminal device and displays the application content on the application interface. With the floating window technology, the floating window unrelated to the application content may be displayed on the application interface of the application run by the terminal device, thereby, achieving some functions through the floating window.

In current methods for displaying content on a same screen, the floating window displayed on the application interface mainly achieves device management functions such as cleaning memory and cleaning garbage for the terminal device by binding some device management instructions such as an instruction for cleaning memory, and the floating window cannot display dynamic content. For example, when the terminal device runs a game application, the floating window is displayed on a game interface by the current floating window technology, and the floating window is only bound to device management instructions such as an instruction for cleaning memory. A user can only achieve objects such as cleaning memory through the floating window when the terminal device runs the game application, and the dynamic content cannot be displayed through the floating window. For example, when the terminal device starts the game application, an object of watching a video cannot be achieved through the floating window displayed on the game interface.

SUMMARY

In view of the above, a method and an apparatus for displaying content on a same screen and a terminal device are provided according to embodiments of the present disclosure, to display dynamic content on a same screen.

To achieve the above object, the following technical solutions are provided according to the embodiments of the present disclosure.

A method for displaying content on a same screen, applied to a terminal device including a display apparatus, is provided. The method includes: displaying an application interface of an application on the display apparatus, and displaying a floating region on the same screen as the application interface; setting a content loader corresponding to the floating region; determining display content of the floating region; and invoking the content loader to load the determined display content to the floating region for display.

An apparatus for displaying content on a same screen, applied to a terminal device including a display apparatus, is also provided according to the embodiment of the disclosure. The apparatus includes: a floating region displaying module, configured to display an application interface of an application on the display apparatus, and display a floating region on the same screen as the application interface; a loader setting module, configured to set a content loader corresponding to the floating region; a display content determining module, configured to determine display content of the floating region; and a display content loading module, configured to invoke the content loader to load the determined display content to the floating region for display.

A terminal device including the above apparatus for displaying content on a same screen is also provided according to the embodiment of the disclosure.

Based on the above technical solutions, the method for displaying content on a same screen according to the embodiments of the present disclosure includes: displaying an application interface of an application on the display apparatus, and displaying a floating region on the same screen as the application interface; setting a content loader corresponding to the floating region; determining display content of the floating region; and invoking the content loader to load the determined display content to the floating region for display. As can be seen that, based on the embodiments of the present disclosure, dynamic content can be displayed on the floating region on the same screen as the application interface by constructing the content loader corresponding to the floating region, when the terminal device displays the application interface. In addition, the display content is loaded and displayed in the floating region through the content loader corresponding to the floating region, thus, mutual interference between a process of loading and displaying the application content displayed on the application interface and a process of loading and displaying the display content in the floating region can be avoided. Therefore, the dynamic content can be stably loaded and displayed in the floating region.

BRIEF DESCRIPTION OF THE DRAWINGS

To illustrate technical solutions according to embodiments of the present disclosure or in the conventional technologies more clearly, drawings to be used in the descriptions of the conventional technologies or the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

Technical solutions of the embodiments of the present disclosure are illustrated clearly and completely in conjunction with the following drawings of the embodiments of the present disclosure. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

Figure 1:
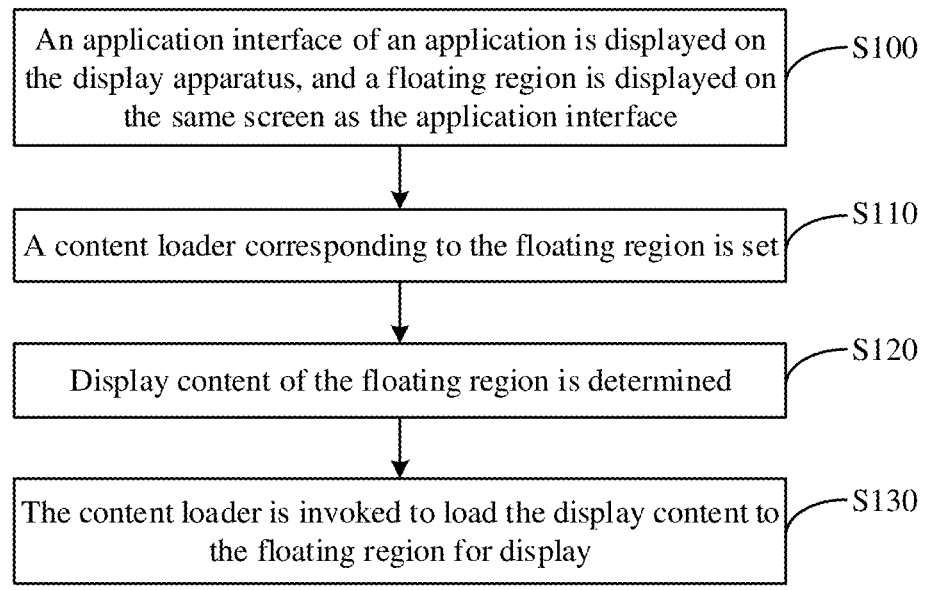
FIG. 1 is a flow chart of a method for displaying content on a same screen according to an embodiment of the present disclosure.

FIG. 1 is a flow chart of a method for displaying content on a same screen according to an embodiment of the present disclosure. The method for displaying content on a same screen may be applied to a terminal device including a display apparatus, and the terminal device may be an user equipment such as an intelligent phone, a tablet computer and a laptop. Reference is made to FIG. 1, the method may include steps S100 to S130.

In step S100, an application interface of an application is displayed on the display apparatus, and a floating region is displayed on the same screen as the application interface.

When a terminal device runs an application, an application interface of the application run by the terminal device is display on a screen of the terminal device, and application content of the application is displayed on the application interface. On this basis, in the embodiment according to the present disclosure, a floating region may be displayed on the same screen as the application interface based on a floating window technology, and the number of the displayed floating regions is greater than or equal to 1.

In the embodiment of the present disclosure, the display size of the floating region may be customized, and the floating region may be minimized and may be dragged on the application interface to adjust a display position.

In step S110, a content loader corresponding to the floating region is set.

In the embodiment of the present disclosure, the content loader corresponding to the floating region is constructed, and content to be displayed in the floating region may be loaded through the content loader. The content loader may be a Classloader (class loader).

In step S120, display content of the floating region is determined.

Optionally, in the embodiment of the present disclosure, the display content of the floating region may be obtained over a network, or from content cached locally by the terminal device.

In step S130, the content loader is invoked to load the display content to the floating region for display.

The method for displaying content on a same screen according to the embodiments of the present disclosure includes: displaying an application interface of an application on the display apparatus, and displaying a floating region on the same screen as the application interface; setting a content loader corresponding to the floating region; determining display content of the floating region; and invoking the content loader to load the determined display content to the floating region for display. As can be seen that, based on the embodiments of the present disclosure, dynamic content can be displayed on the floating region on the same screen as the application interface by constructing the content loader corresponding to the floating region, when the terminal device displays the application interface. In addition, the display content is loaded and displayed in the floating region through the content loader corresponding to the floating region, thus, mutual interference between a process of loading and displaying the application content displayed on the application interface and a process of loading and displaying the display content in the floating region can be avoided. Therefore, the dynamic content can be stably loaded and displayed in the floating region.

In the embodiment of the present disclosure, a loading mechanism for the application content on the application interface is not the same as a loading mechanism for the display content in the floating region. In the embodiment of the present disclosure, the display content in the floating region is loaded through the constructed content loader corresponding to the floating region, and the application content on the application interface may be loaded through a service interface interacting with an underlying layer of a system provided by the terminal device.

Further, in the embodiment of the present disclosure, the service interface interacting with the underlying layer of the system may be invoked to load content in an installation package of the application to display the application content on the application interface.

Optionally, for an Android operating system, the service interface interacting with the underlying layer of the system may be a Qmi interface.

Figure 2:
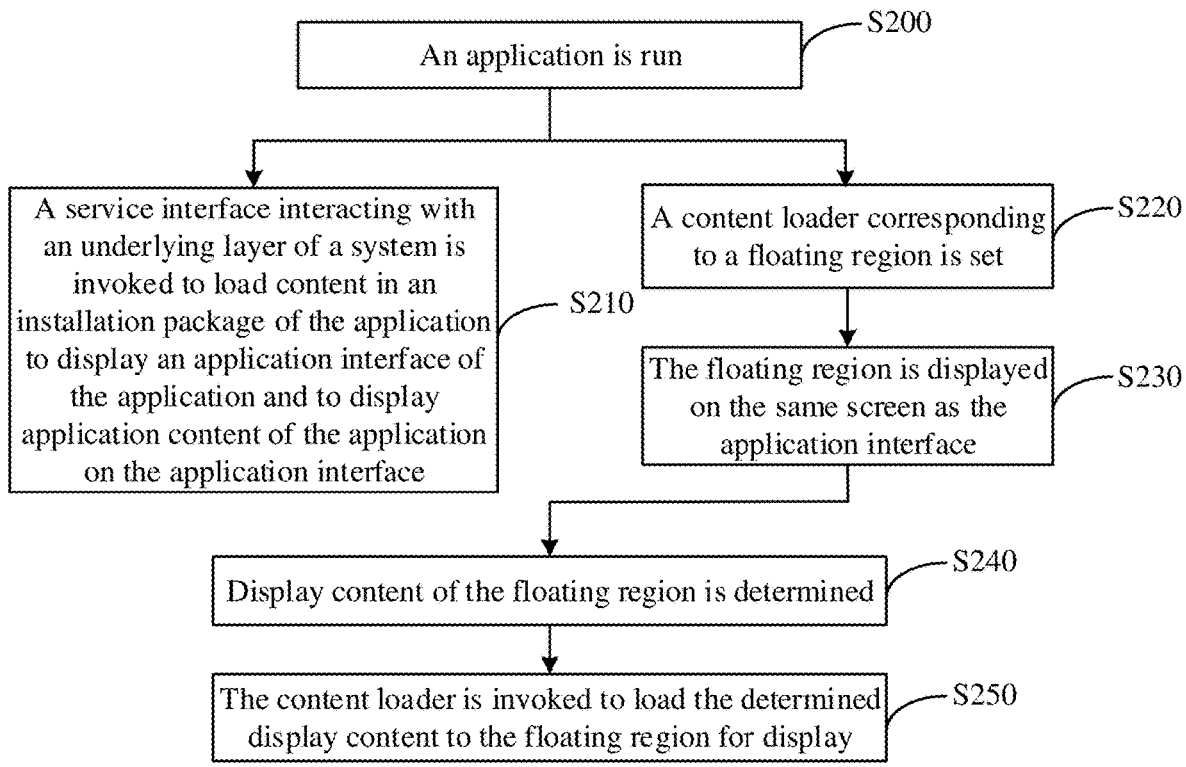
FIG. 2 is a flow chart of a method for displaying content on a same screen according to another embodiment of the present disclosure.

FIG. 2 is a flow chart of a method for displaying content on a same screen according to another embodiment of the present disclosure. Reference is made to FIG. 2, the method may include steps S200 to S250.

In step S200, an application is run.

In step S210, a service interface interacting with an underlying layer of a system is invoked to load content in an installation package of the application to display an application interface of the application and to display application content of the application on the application interface.

Optionally, step S210 may be performed continuously to achieve continuous loading and dynamic change of the application content on the application interface.

Optionally, on an Android operating system, a terminal device may invoke the Qmi interface to load the content in the installation package of the application after starting the application, thereby displaying the application interface on a screen and displaying the application content on the application interface.

In step S220, a content loader corresponding to a floating region is set.

In step S230, the floating region is displayed on the same screen as the application interface.

In step S240, display content of the floating region is determined.

In step S250, the content loader is invoked to load the determined display content to the floating region for display.

As can be seen that, steps S220 to S250 may be not interfered mutually with step S210 in the embodiment of the present disclosure.

The Android operating system is taken as an example in the embodiment of the present disclosure. After the application is started, and the Qmi interface is invoked to load the application content, the Classloader corresponding to the floating region is invoked to load the display content of the floating region. Therefore, the display content may be loaded and displayed stably and dynamically in the floating region through a loading mechanism different from the loading mechanism for the application content on the application interface.

Optionally, in the embodiment of the present disclosure, in determining the display content of the floating region, a filtration condition for the content to be displayed in the floating region may be inputted through a content filtration frame displayed in the floating region, thereby obtaining the display content meeting the filtration condition, and the content loader loads the obtained display content.

Figure 3:
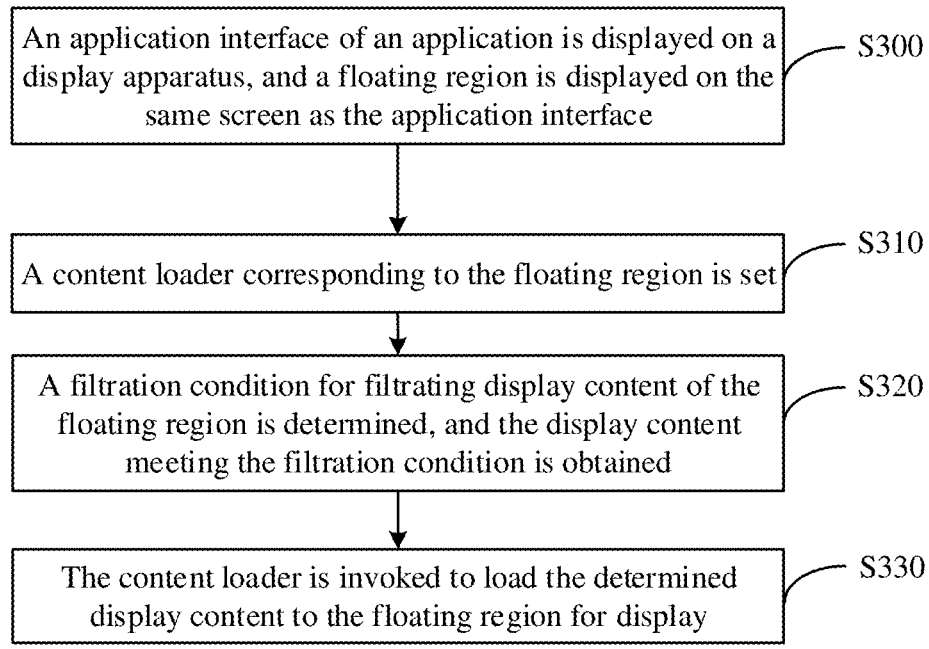
FIG. 3 is a flow chart of a method for displaying content on a same screen according to another embodiment of the present disclosure.

FIG. 3 is a flow chart of a method for displaying content on a same screen according to another embodiment of the present disclosure. Reference is made to FIG. 3, the method may include steps S300 to S330.

In step S300, an application interface of an application is displayed on a display apparatus, and a floating region is displayed on the same screen as the application interface.

In step S310, a content loader corresponding to the floating region is set.

In step S320, a filtration condition for filtrating display content of the floating region is determined, and the display content meeting the filtration condition is obtained.

Optionally, the obtained display content may be pictures, videos or texts. A specific type of the display content may be customized.

In step S330, the content loader is invoked to load the determined display content to the floating region for display.

Figure 4:
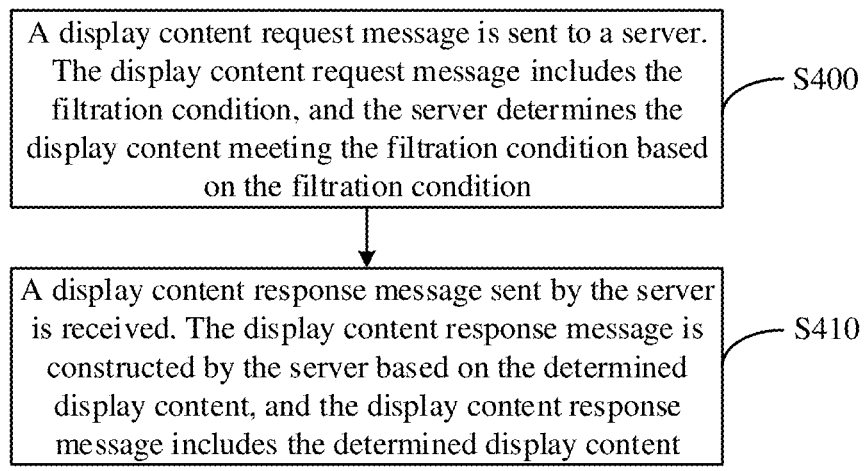
FIG. 4 is a flow chart of a method for obtaining display content according to an embodiment of the present disclosure.

Optionally, in the embodiment of the present disclosure, the display content meeting the filtration condition may be obtained by requesting the display content from a server. FIG. 4 is a flow chart of a method for obtaining display content according to an embodiment of the present disclosure. Reference is made to FIG. 4, the method for obtaining display content may include steps S400 to S410.

In step S400, a display content request message is sent to a server. The display content request message includes the filtration condition, and the server determines the display content meeting the filtration condition based on the filtration condition.

In the step, the filtration condition may be a name, or URL of the display content, or may also be some attribute conditions of the display content, such as issuing time, or a category to which the display content belongs. The specific type of the filtration condition may be determined based on practical situations.

A database may be set in the server to store the display content and description information of the display content. After receiving the filtration condition, the server can find the description information corresponding to the filtration condition based on the description information of the display content, and retrieval display content of the description information corresponding to the filtration condition.

In step S410, a display content response message sent by the server is received. The display content response message is constructed by the server based on the determined display content, and the display content response message includes the determined display content.

Figure 5:
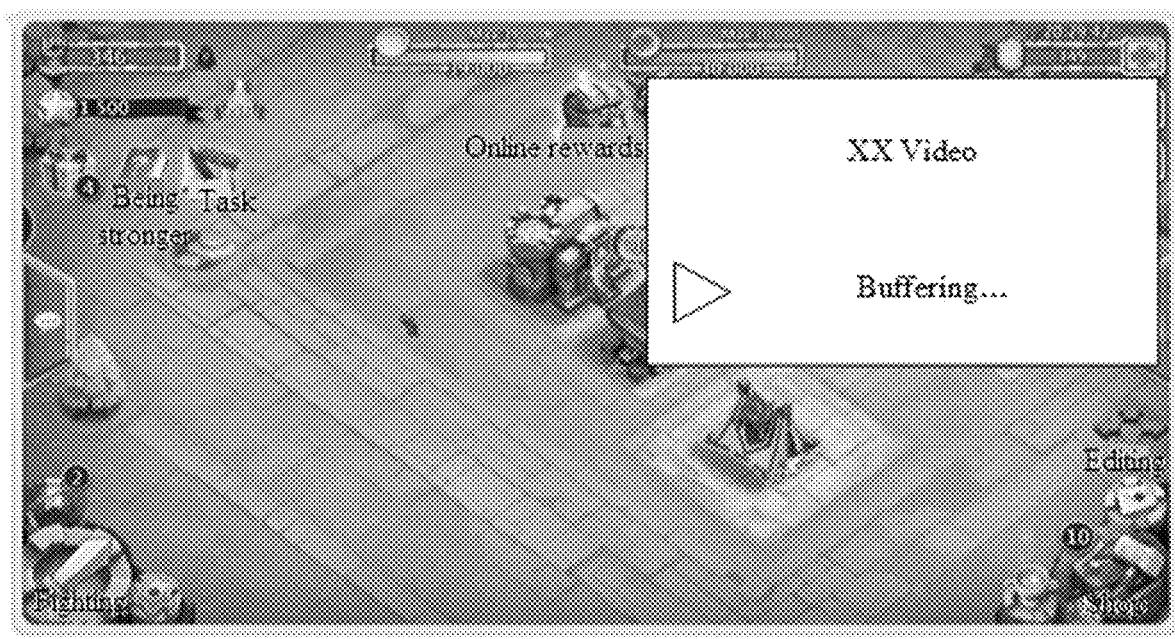
FIG. 5 is an effect diagram of watching a video on a same screen through a floating region on a game application interface according to an embodiment of the present disclosure.

In the embodiment of the present disclosure, an example of dynamically displaying a video on a same screen in the floating region is taken. A video search condition may be inputted in a video browsing frame in the floating region, after displaying the floating region on the same screen on the application interface. For example, the video search condition may be a video name, a URL corresponding to the video. The terminal device may request a video corresponding to the inputted video search condition from the server. After retrieving the video corresponding to the video search condition, the server may send video data of the video to the terminal device. In this case, the content loader corresponding to the floating region set in the terminal device may load the obtained video data to the video browsing frame in the floating region for display. FIG. 5 is an effect diagram of watching a video on a same screen through a floating region on a game application interface according to an embodiment of the present disclosure.

Obviously, the content displayed in the floating region may also be pictures, or texts, and the specific type of the content may be set based on practical situations.

Further, the content displayed in the floating region may be related to the application content displayed on the application interface, for example, the content displayed in the floating region may be reference content of the application content displayed on the application interface. For example, in video application scenarios, the content displayed in the floating region may be comment content for a video. When the video is played on a video interface, the comment content for the video may be dynamically displayed through the floating region displayed on the same screen as the video interface. In game application scenarios, the content displayed in the floating region may be strategy content for a game (such as strategy videos, strategy pictures, game matrix method introductions), and the strategy content for the game may be displayed through the floating region displayed on the same screen as a game interface when game content is displayed on the game interface.

Figure 6:
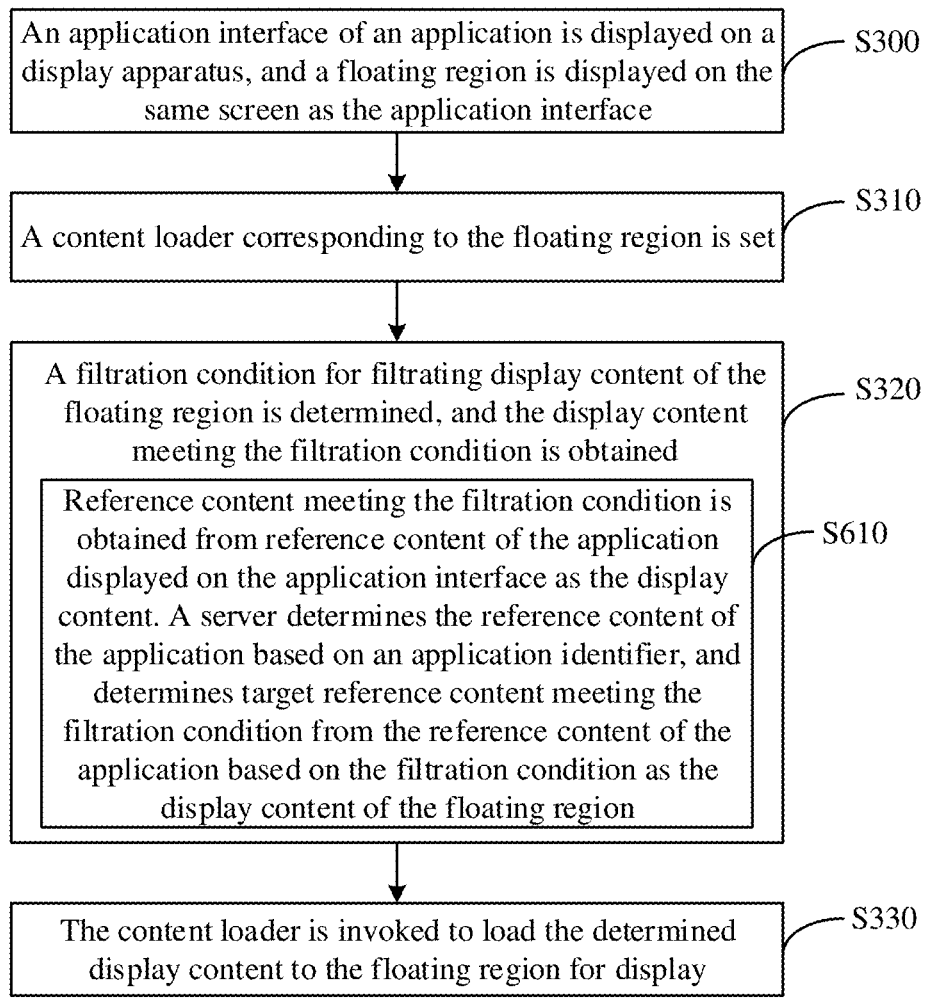
FIG. 6 is a flow chart of a method for displaying content on a same screen according to another embodiment of the present disclosure.

Optionally, FIG. 6 is a flow chart of a method for displaying content on a same screen according to another embodiment of the present disclosure. The method shown in FIG. 6 is based on the embodiment shown in FIG. 3. Step S320 further includes step S610.

In step S610, reference content meeting the filtration condition is obtained from reference content of the application displayed on the application interface as the display content. A server determines the reference content of the application based on an application identifier, and determines target reference content meeting the filtration condition from the reference content of the application based on the filtration condition as the display content of the floating region.

Optionally, after receiving the application identifier of the application and the filtration condition for the reference content to be displayed, the server may determine the reference content of the application based on the application identifier, and determine the target reference content meeting the filtration condition from the reference content of the application based on the filtration condition, and send the determined target reference content to the terminal device.

A game application scenario is taken as an example. After starting a game application, a terminal device may display a game application interface, and load game content to the game interface for display from an installation package of the game application via the Qmi interface. At the same time, in the embodiment of the present disclosure, a floating region may be displayed on the same screen as the game interface with the floating window technology. A filtration frame for game reference content (such as a game matrix method) may be displayed in the floating region. After a user selects the filtration condition for the game reference content from the filtration frame, the terminal device may request the game reference content corresponding to the selected filtration condition from the server. After the server sends the game reference content corresponding to the filtration condition to the terminal device, the terminal device may load the game reference content corresponding to the filtration condition to the floating region for display through the Classloader corresponding to the floating region.

Specifically, the loaded game reference content may be pictures, videos, comments for the game. Correspondingly, the floating region may set a picture browsing frame to display the loaded pictures, set a video browsing frame to display the loaded videos, and set a text frame to display the loaded texts.

Optionally, in the embodiment of the present disclosure, in displaying the reference content of the application content in the floating region, since the reference content is related to the application content, a mechanism of applying the reference content to the application interface may be further set in the embodiment of the present disclosure. For example, the game matrix method displayed in the floating region may be applied to the game interface, thereby changing a matrix method currently used by the game.

Figure 7:
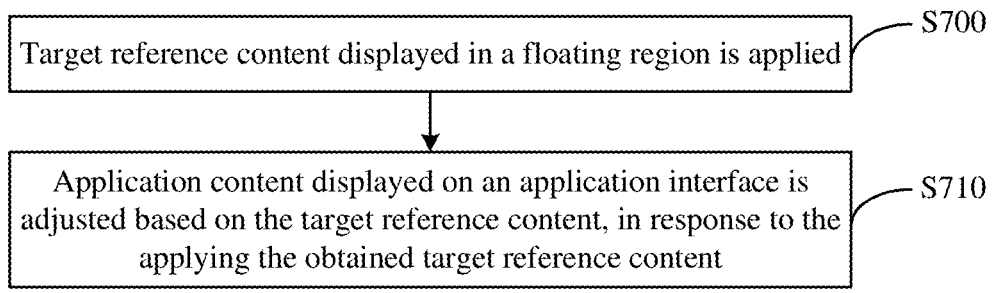
FIG. 7 is a flow chart of a method for applying reference content according to an embodiment of the present disclosure.

FIG. 7 is a flow chart of a method for applying reference content according to an embodiment of the present disclosure. Reference is made to FIG. 7, the method for applying reference content may include steps S700 to S710.

In step S700, target reference content displayed in a floating region is applied.

In step S710, application content displayed on an application interface is adjusted based on the target reference content, in response to the applying the obtained target reference content.

Optionally, in the embodiment of the present disclosure, a content identifier of the reference content displayed in the floating region may be transferred to an application process through interprocess communications. After obtaining the content identifier, the application process may retrieve content corresponding to the content identifier from an installation package of the application through a service interface (such as Qmi interface) which interacts with an underlying layer of a system, so as to adjust the application content displayed on the application interface to correspond to the content identifier.

A game scenario is taken as an example. When a game is played in a matrix method on a game interface, information of other matrix methods (such as pictures and videos of the matrix methods) of the game may be displayed in the floating region displayed on the same screen as the game interface. A user may trigger an application control component displayed in the floating region, when the user intends to change a current game matrix method to a matrix method displayed in the floating region. In this case, a matrix method identifier displayed in the floating region may be transferred to the game process through interprocess communications, and the game process may retrieve content of the matrix method corresponding to the matrix method identifier from the installation package of the game application through the service interface which interacts with an underlying layer of a system such as Qmi interface, so as to display the retrieved content of the matrix method on the game interface and change the matrix method used by the game.

Optionally, in a case of an abnormal network, the terminal device cannot obtain the display content of the floating region from the server. In this case, the display content of the floating region may also be obtained from content cached locally by the terminal device in the embodiment of the present disclosure. Specifically, in a case that the network is abnormal, the display content meeting the filtration condition may be obtained from the content cached locally by the terminal device, and a content loader corresponding to the floating region loads the obtained display content to the floating region for display.

Further, the content cached locally by the terminal device may be updated, when the terminal device obtains new display content from the server. Specifically, after receiving the display content meeting to the filtration condition sent by the server, the terminal device may update the content cached locally by the terminal device based on the display content sent by the server.

It should be noted that, in the case of obtaining the display content of the floating region locally, the type of the display content and the subsequent display processing strategy in the floating region may be similar to those in the case of requesting the display content from the server.

Figure 8:
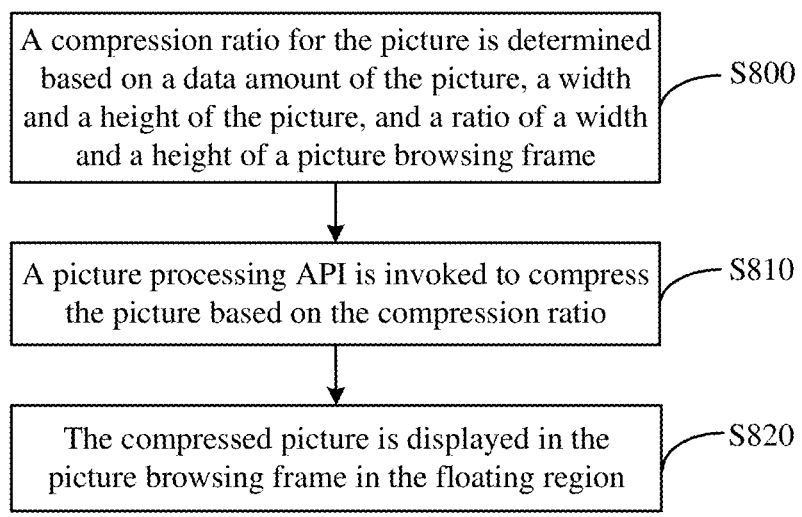
FIG. 8 is a flow chart of a method for loading and displaying a picture in a floating region according to an embodiment of the present disclosure.

Optionally, in the embodiment of the present disclosure, when a picture is displayed in a floating region, the picture may be compressed, and the compressed picture is displayed in a picture browsing frame of the floating region. FIG. 8 is a flow chart of a method for loading and displaying a picture in a floating region according to an embodiment of the present disclosure. The method shown in FIG. 8 is based on the embodiment shown in FIG. 1. The method may further include steps S800 to S820.

In step S800, a compression ratio for the picture is determined based on a data amount of the picture, a width and a height of the picture, and a ratio of a width and a height of a picture browsing frame. The picture browsing frame is a region for displaying the picture in the floating region.

In step S810, a picture processing API (application program interface) is invoked to compress the picture based on the compression ratio.

In step S820, the compressed picture is displayed in the picture browsing frame in the floating region.

In the embodiment of the present disclosure, a picture browsing component for the floating region is optimized. Specifically, in the embodiment of the present disclosure, the picture may be compressed by adopting the picture processing API of the system. The compression ratio may be determined based on a data amount of the picture, a width and a height of the picture, and a ratio of a width and a height of a picture browsing frame. Specific determination strategies for the compression ratio may be set based on practical situations.

Optionally, in the embodiment of the present disclosure, in addition to functions such as zooming a picture and dragging a picture, the picture browsing component may further set a boundary-sensing mechanism for the picture browsing frame in dragging the picture, to avoid a case that a picture in the picture browsing frame is dragged out of sight. Correspondingly, when the picture is dragged, it is determined whether a position of the dragged picture reaches a boundary of the picture browsing frame, and the picture is prevented from being dragged toward the boundary in a case that the position of the dragged picture reaches the boundary of the picture browsing frame.

In the embodiments of the present disclosure, dynamic content can be displayed on the floating region on the same screen as the application interface by constructing the content loader corresponding to the floating region, when the terminal device displays the application interface. In addition, the display content is loaded and displayed in the floating region through the content loader corresponding to the floating region, thus, mutual interference between a process of loading and displaying the application content displayed on the application interface and a process of loading and displaying the display content in the floating region can be avoided. Therefore, the dynamic content can be stably loaded and displayed in the floating region.

Hereinafter an application example according to an embodiment of the present disclosure is described by taking a tower defense game scenario as an example. In the following embodiment, functions such as viewing pictures, texts, videos of tower defense game formation and arranging formation are implemented mainly through a floating region on a game interface. The functions implemented by the floating region may be in a form of plug-ins.

Figure 9:
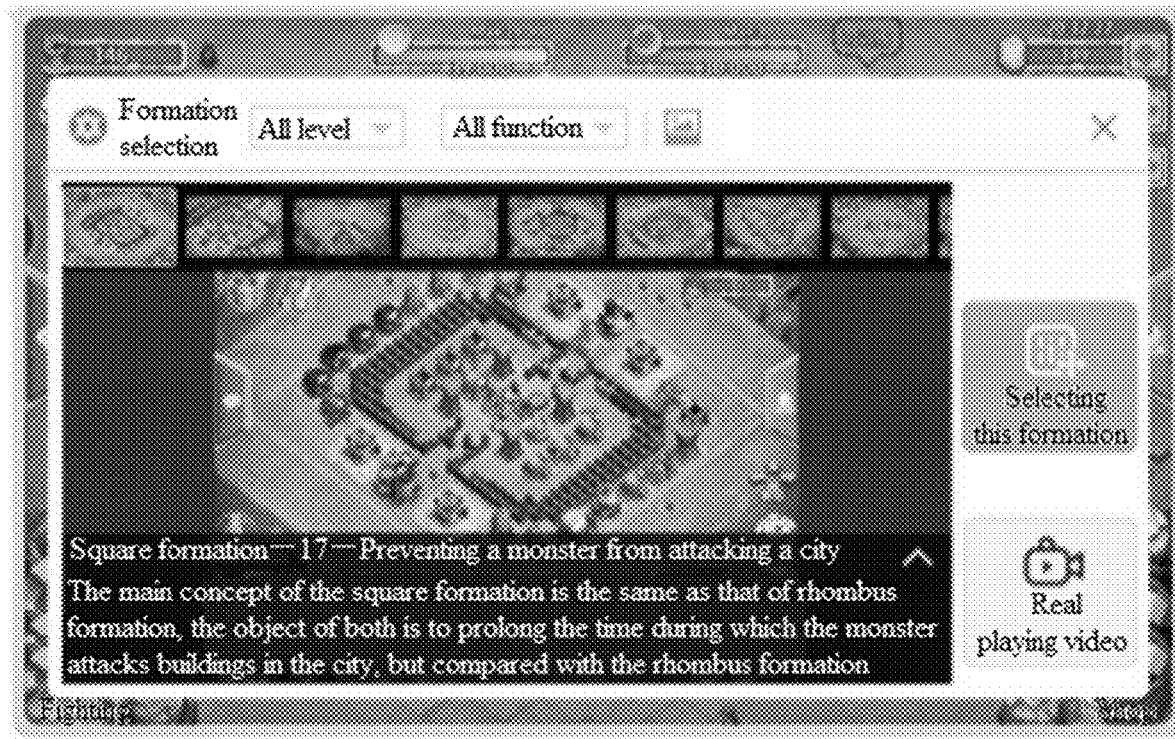
FIG. 9 is a schematic diagram of an application example according to an embodiment of the present disclosure.

Reference is made to FIG. 9. When running a tower defense game and a plug-in of the floating region, a terminal device may invoke game content in a game installation package through the Qmi interface and display the game content on the game interface, and may display a floating region on the same screen as the game interface. The display size of the floating region in the embodiment of the present disclosure may be adjustable. FIG. 9 is only a representation of the floating region.

The floating region shown in FIG. 9 includes filtration frames, such as a formation level and a formation function. After a user selects a filtration condition for a formation to be displayed (for example, the filtration conditions such as the formation level and the formation function are selected), the terminal device may request formation information meeting the filtration condition in the formation information of the tower defense game stored in a server from the server. The formation information may include, for example, a picture, a video and text description of the formation.

After obtaining the formation information corresponding to the filtration condition from the server, the terminal device may load the formation information to the floating region through the Classloader. Specifically, formation pictures may be loaded to a picture browsing frame in the floating region, and texts may be loaded to a text browsing frame in the floating region. Optionally, the server may set a correspondence between formation ID, formation description information and formation information (including pictures, videos of the formation, etc.). When the terminal device requests the formation information meeting the filtration condition from the server, the server may determine target formation description information meeting the filtration condition based on the formation description information of various formations, so as to retrieve the formation ID and the formation information corresponding to the target formation description information corresponding to the filtration condition and send the formation information to the terminal device.

Further, in a case that the network environment is abnormal, the terminal device may directly retrieve the formation information corresponding to the filtration condition from the local cache, and load the formation information meeting the filtration condition in the local cache to the floating region through the Classloader for display.

When viewing pictures, texts, or even videos of the formation displayed in the floating region, a user may click the control component of "selecting this formation" shown in FIG. 9 and apply a currently viewed formation to the game, if the user wants to change the current formation of the game to the currently viewed formation. In viewing a video, a video URL corresponding to the currently viewed formation may be requested from the server. For example, the video URL corresponding to the formation ID may be set in the server. Therefore, in a case that the terminal device requests a video corresponding to a formation ID, video data of the video URL corresponding to the formation ID may be retrieved and sent to the terminal device, and the terminal device may load the video data to the floating region for display through the Classloader after obtaining the video data.

Hereinafter an apparatus for displaying content on a same screen according to an embodiment of the present disclosure is described. The apparatus for displaying content on a same screen may refer to the method for displaying content on a same screen described in the above.

Figure 10:
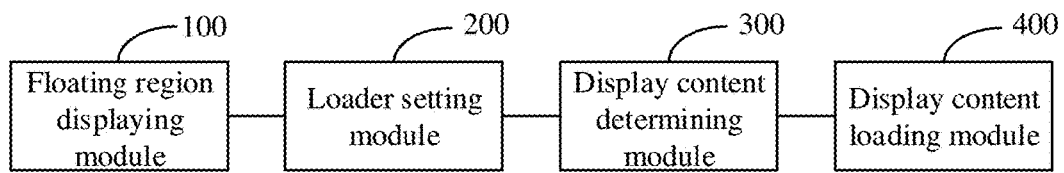
FIG. 10 is a structural block diagram of an apparatus for displaying content on a same screen according to an embodiment of the present disclosure.

FIG. 10 is a structural block diagram of an apparatus for displaying content on a same screen according to an embodiment of the present disclosure. The apparatus for displaying content on a same screen may be applied to a terminal device including a display apparatus. Reference is made to FIG. 10, the apparatus for displaying content on a same screen may include a floating region displaying module 100, a loader setting module 200, a display content determining module 300 and a display content loading module 400. The floating region displaying module 100 is configured to display an application interface of an application on the display apparatus, and display a floating region on the same screen as the application interface. The loader setting module 200 is configured to set a content loader corresponding to the floating region. The display content determining module 300 is configured to determine display content of the floating region. The display content loading module 400 is configured to invoke the content loader to load the determined display content to the floating region for display.

Figure 11:
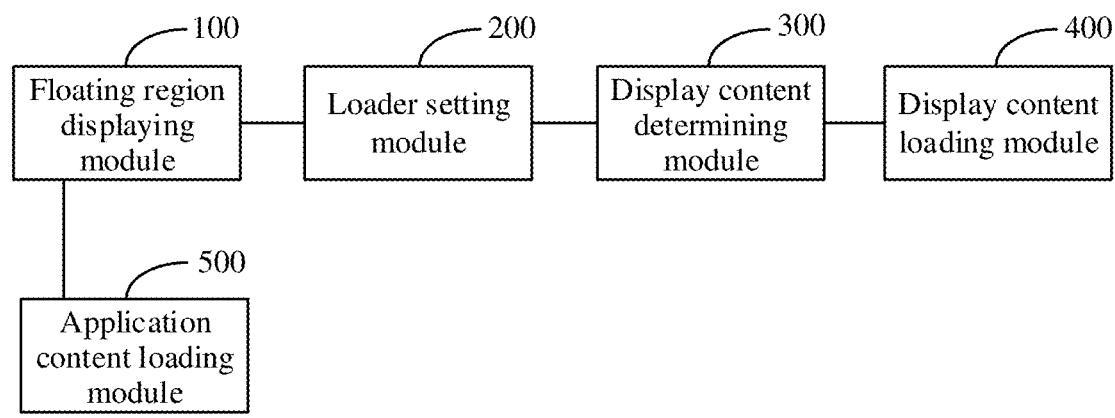
FIG. 11 is a structural block diagram of an apparatus for displaying content on a same screen according to another embodiment of the present disclosure.

Optionally, FIG. 11 is a structural block diagram of an apparatus for displaying content on a same screen according to another embodiment of the present disclosure. The apparatus shown in FIG. 11 is based on the embodiment shown in FIG. 10, and the apparatus may further include: an application content loading module 500, configured to invoke a service interface interacting with an underlying layer of a system to load content in an installation package of the application to display application content of the application on the application interface.

Figure 12:
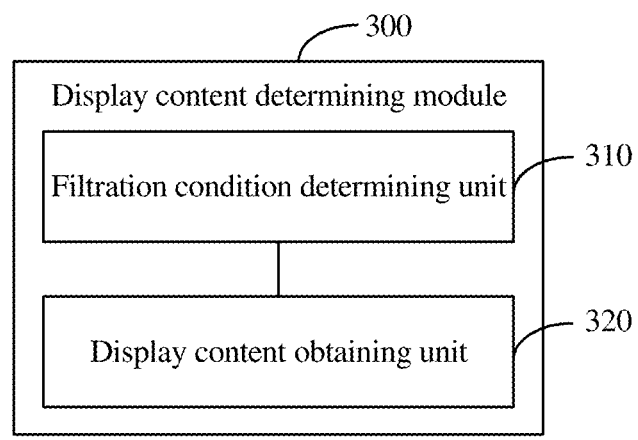
FIG. 12 is a structural block diagram of a display content determining module according to an embodiment of the present disclosure.

Optionally, FIG. 12 shows an optional structure of the display content determining module 300 according to an embodiment of the present disclosure. Reference is made to FIG. 12, the display content determining module 300 may include a filtration condition determining unit 310 and a display content obtaining unit 320. The filtration condition determining unit 310 is configured to determine a filtration condition for filtrating the display content of the floating region. The display content obtaining unit 320 is configured to obtain the display content meeting the filtration condition.

Figure 13:
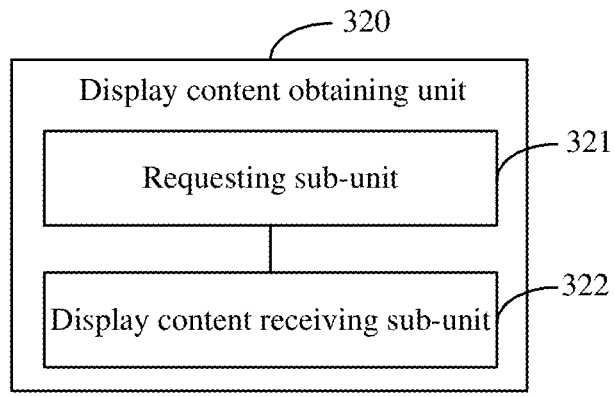
FIG. 13 is a structural block diagram of a display content obtaining unit according to an embodiment of the present disclosure.

Optionally, FIG. 13 shows an optional structure of the display content obtaining unit 320 according to an embodiment of the present disclosure. Reference is made to FIG. 13, the display content obtaining unit 320 may include a requesting sub-unit 321 and a display content receiving sub-unit 322.

The requesting sub-unit 321 is configured to send a display content request message to a server, the display content request message includes the filtration condition, and the server determines the display content meeting the filtration condition based on the filtration condition. The display content receiving sub-unit 322 is configured to receive a display content response message sent by the server, the display content response message is constructed by the server based on the determined display content, and the display content response message includes the determined display content.

Optionally, the display content may be reference content of application content displayed on the application interface. Correspondingly, the requesting sub-unit 321 may be configured to send an application identifier of the application and a filtration condition for the reference content to be displayed to the server.

In another embodiment of the present disclosure, the filtration condition may include an application identifier of the application displayed on the application interface.

Correspondingly, the display content obtaining unit is further configured to obtain reference content meeting the filtration condition from reference content of the application displayed on the application interface as the display content. A server determines the reference content of the application based on the application identifier, and determines target reference content meeting the filtration condition from the reference content of the application based on the filtration condition as the display content of the floating region.

Figure 14:
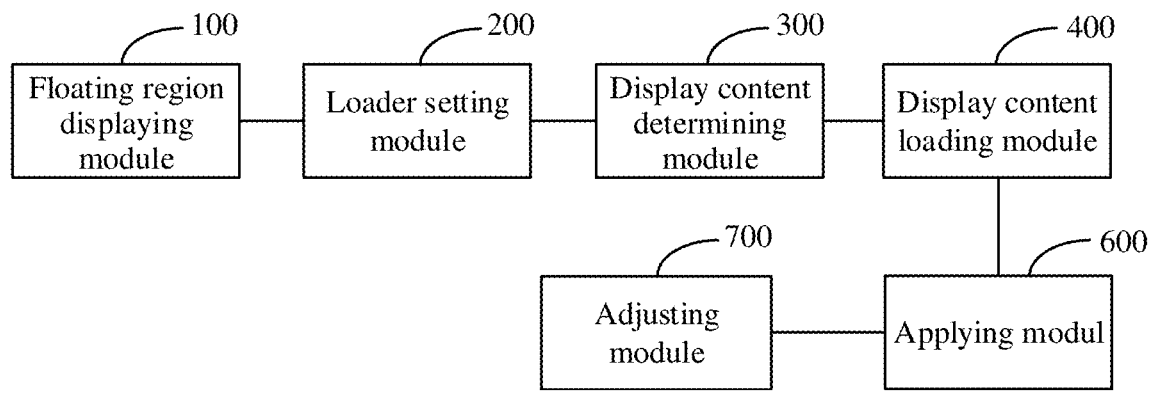
FIG. 14 is a structural block diagram of an apparatus for displaying content on a same screen according to another embodiment of the present disclosure.

In another embodiment of the present disclosure, FIG. 14 is a structural block diagram of an apparatus for displaying content on a same screen according to another embodiment of the present disclosure. The apparatus shown in FIG. 14 is based on the embodiment shown in FIG. 10, the apparatus may further include an applying module 600 and an adjusting module 700. The applying module 600 is configured to apply the reference content displayed in the floating region. The adjusting module 700 is configured to adjust application content displayed on the application interface based on the reference content.

Optionally, in a case of an abnormal network, the display content determining module 300 may be further configured to obtain the display content meeting the filtration condition from content cached locally by the terminal device.

Figure 15:
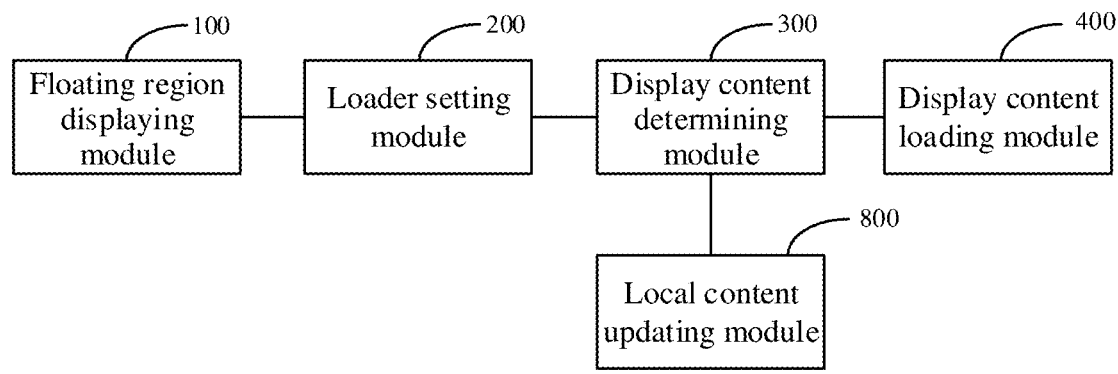
FIG. 15 is a structural block diagram of an apparatus for displaying content on a same screen according to another embodiment of the present disclosure.

Further, FIG. 15 is a structural block diagram of an apparatus for displaying content on a same screen according to another embodiment of the present disclosure. The apparatus shown in FIG. 15 is based on the embodiment shown in FIG. 10, the apparatus may further include a local content updating module 800 configured to receive the display content meeting the filtration condition from the server, and update the content cached locally by the terminal device based on the received display content.

Optionally, the display content of the floating region may be a picture. Correspondingly, in a process of invoking the content loader and loading the picture to the floating region for display, the display content loading module 400 may determine a compression ratio for the picture based on a data amount of the picture, a width and a height of the picture, and a ratio of a width and a height of a picture browsing frame, invoke a picture processing API to compress the picture based on the compression ratio, and load the compressed picture to the picture browsing frame in the floating region for display.

Figure 16:
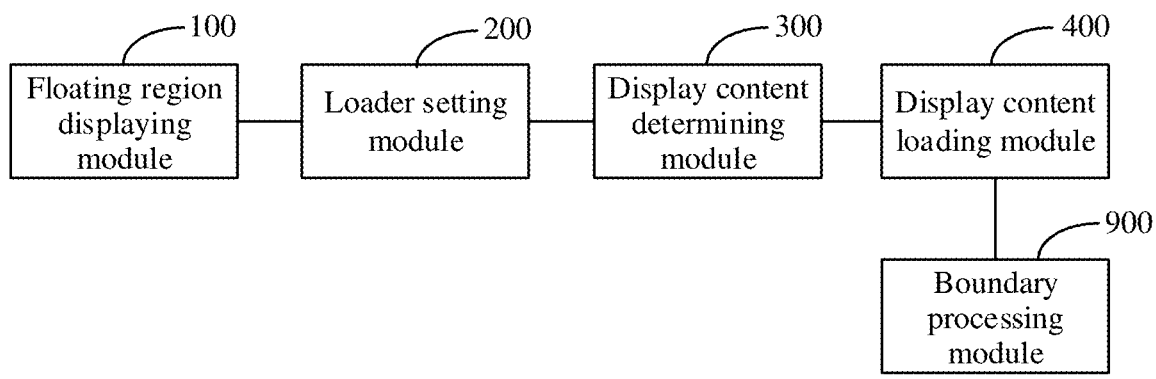
FIG. 16 is a structural block diagram of an apparatus for displaying content on a same screen according to another embodiment of the present disclosure.

Further, in the embodiment of the present disclosure, a boundary-sensing mechanism for a picture browsing frame may be set in dragging the picture. FIG. 16 is a structural block diagram of an apparatus for displaying content on a same screen according to another embodiment of the present disclosure. The apparatus shown in FIG. 16 is based on the embodiment shown in FIG. 10, and the apparatus may further include a boundary processing module 900 configured to: determine, when the picture is dragged, whether a position of the dragged picture reaches a boundary of the picture browsing frame in the floating region, and prevent the picture from being dragged toward the boundary in a case that the position of the dragged picture reaches the boundary of the picture browsing frame.

A terminal device is further provided according to an embodiment of the present disclosure. The terminal device may include the above apparatus for displaying content on a same screen.

The terminal device according to an embodiment of the present disclosure can dynamically load the display content in the floating region on the same screen as the application interface. In addition, mutual interference between a process of loading and displaying the application content displayed on the application interface and a process of loading and displaying the display content in the floating region can be avoided. Therefore, the dynamic content can be stably loaded and displayed in the floating region.

Figure 17:
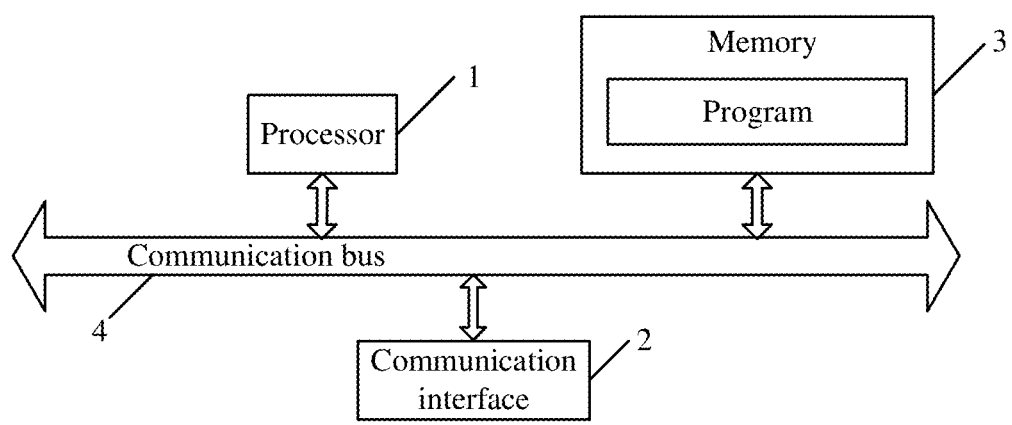
FIG. 17 is a structural block diagram of hardware of a terminal device according to an embodiment of the present disclosure.

FIG. 17 is a structural block diagram of hardware of a terminal device according to an embodiment of the present disclosure. Reference is made to FIG. 17, the terminal device may include: a processor 1, a communication interface 2, a memory 3 and a communication bus 4. The processor 1, the communication interface 2 and the memory 3 communicate with each other via the communication bus 4. Optionally, the communication interface 2 may be an interface of a communication module, for example, an interface of a GSM module. The processor 1 is configured to execute a program. The memory 3 is configured to store the program. The program may include program code, and the program code includes a computer operation instruction. The processor 1 may be a central processor CPU, an application specific integrated circuit (ASIC), or one or more integrated circuits configured to implement the embodiments of the present disclosure. The memory 3 may include a high-speed RAM memory, or a non-volatile memory, for example, at least one disk memory.

The program may be specifically configured to: display an application interface of an application on the display apparatus, and display a floating region on the same screen as the application interface; set a content loader corresponding to the floating region; determine display content of the floating region; and invoke the content loader to load the determined display content to the floating region for display.

The embodiments of the present disclosure are described in a progressive manner and each embodiment places emphasis on the difference from other embodiments. One embodiment can refer to other embodiments for the same or similar parts. The apparatus disclosed in the embodiments are simply described, for they correspond to the methods disclosed in the embodiments, and correlation parts can refer to the description in method parts.

It should be further appreciated by those skilled in the art that, units and algorithm steps of the various examples described in the embodiments of the present disclosure can be implemented in electronic hardware, computer software, or a combination of both. In order to clearly illustrate interchangeability between the hardware and the software, components and steps of various examples are generally described in the above in terms of functionality. Whether these functions are implemented in hardware or in software depends on the specific application and design constraints of the technical solutions. Different methods can be used by those skilled in the art to implement the described functions for each particular application, but such implementations should not be considered as departing from the scope of the present disclosure.

The steps of a method or an algorithm described in the embodiments of present disclosure may be implemented directly by hardware, a software module executed by a processor, or by a combination of both. The software modules may be arranged in a random access memory (RAM), memory, read only memory (ROM), electrically programmable ROM, electrically erasable programmable ROM, register, hard disk, removable disk, CD-ROM, or storage medium in any other form known in the art.

According to the description of the disclosed embodiments, the present disclosure may be implemented or used by those skilled in the art. Various modifications made to these embodiments are apparent for those skilled in the art, and a normal principle defined in the present disclosure may be implemented in other embodiments without departing from spirit or scope of the present disclosure. Therefore, the present disclosure is not limited to the embodiments described in the present disclosure but confirms to a widest scope in accordance with principles and novel features disclosed in the present disclosure.

The invention claimed is:

1. A method for displaying content on a same screen, applied to a terminal device comprising a display apparatus, comprising:
  displaying an application interface of an application on the display apparatus and displaying application content of the application on the application interface by invoking a service interface interacting with an underlying layer of an operating system installed in the terminal device;
  displaying a floating region on the same screen as the application interface;
  setting a class loader corresponding to the floating region;
  determining display content of the floating region; and
  invoking the class loader to load the determined display content to the floating region for display, while displaying the application content of the application on the application interface by invoking the service interface;
  wherein the service interface for the application content on the application interface and the class loader for the display content in the floating region have different loading mechanisms;
  obtaining an identifier of the display content displayed in the floating region through interprocess communication;
  retrieving content corresponding to the identifier from an installation package of the application through a Qmi interface; and
  adjusting the application content displayed on the application interface based on the retrieved content.

2. The method for displaying content on a same screen according to claim 1, wherein the determining the display content of the floating region comprises:
  determining a filtration condition for filtrating the display content of the floating region; and
  obtaining the display content meeting the filtration condition.

3. The method for displaying content on a same screen according to claim 2, wherein the obtaining the display content meeting the filtration condition comprises:
  sending a display content request message to a server, wherein the display content request message comprises the filtration condition, and the server determines the display content meeting the filtration condition based on the filtration condition; and
  receiving a display content response message sent by the server, wherein the display content response message is constructed by the server based on the determined display content, and the display content response message comprises the determined display content.

4. The method for displaying content on a same screen according to claim 3, wherein the obtaining the display content meeting the filtration condition further comprises at least one of:
  obtaining the display content meeting the filtration condition from content cached locally by the terminal device; and
  receiving the display content meeting the filtration condition from the server, and updating the content cached locally by the terminal device based on the received display content.

5. The method for displaying content on a same screen according to claim 2, wherein the filtration condition comprises an application identifier of the application displayed on the application interface, and the obtaining the display content meeting the filtration condition comprises:
  determining reference content of the application based on the application identifier;

determining target reference content meeting the filtration condition from the reference content of the application based on the filtration condition; and displaying the target reference content in the floating region.

6. The method for displaying content on a same screen according to claim 5, further comprising:

applying the target reference content displayed in the floating region, wherein adjusting the application content displayed on the application interface based on the display content displayed in the floating region comprises adjusting the application content displayed on the application interface based on the target reference content.

7. The method for displaying content on a same screen according to claim 1, wherein the display content is a picture, the method further comprising loading the determined display content to the floating region for display, wherein the loading comprises:

determining a compression ratio for the picture based on a data amount of the picture, a width and a height of the picture, and a ratio of a width and a height of a picture browsing frame, wherein the picture browsing frame is a region for displaying the picture in the floating region;

invoking a picture processing application program interface to compress the picture based on the compression ratio; and loading the compressed picture to the picture browsing frame in the floating region for display.

8. The method for displaying content on a same screen according to claim 7, further comprising:

determining, when the picture is dragged, whether a position of the dragged picture reaches a boundary of the picture browsing frame, and preventing the picture from being dragged toward the boundary in a case that the position of the dragged picture reaches the boundary of the picture browsing frame.

9. An apparatus for displaying content on a same screen, comprising a terminal device having a display apparatus, a processor and a memory for storing program instructions, wherein the processor executes the program instructions to:

display an application interface of an application on the display apparatus and display application content of the application on the application interface by invoking a service interface interacting with an underlying layer of an operating system installed in the terminal device;

display a floating region on the same screen as the application interface;

set a class loader corresponding to the floating region;

determine display content of the floating region;

invoke the class loader to load the determined display content to the floating region for display, while displaying the application content of the application on the application interface by invoking the service interface, wherein the service interface for the application content on the application interface and the class loader for the display content in the floating region have different loading mechanisms;

obtain an identifier of the display content displayed in the floating region through interprocess communication;

retrieve content corresponding to the identifier from an installation package of the application through a Qmi interface; and adjust the application content displayed on the application interface based on the retrieved content.

10. The apparatus for displaying content on a same screen according to claim 9, wherein the processor executes the program instructions further to:

determine a filtration condition for filtrating the display content of the floating region; and obtain the display content meeting the filtration condition.

11. The apparatus for displaying content on a same screen according to claim 10, wherein the processor executes the program instructions further to:

send a display content request message to a server, wherein the display content request message comprises the filtration condition, and the server determines the display content meeting the filtration condition based on the filtration condition; and receive a display content response message sent by the server, wherein the display content response message is constructed by the server based on the determined display content, and the display content response message comprises the determined display content.

12. The apparatus for displaying content on a same screen according to claim 11, wherein the filtration condition comprises an application identifier of the application displayed on the application interface, and the processor executes the program instructions further to:

determine reference content of the application based on the application identifier;

determine target reference content meeting the filtration condition from the reference content of the application based on the filtration condition; and display the target reference content in the floating region.

13. The apparatus for displaying content on a same screen according to claim 12, wherein the processor executes the program instructions further to:

apply the target reference content displayed in the floating region; and adjust the application content displayed on the application interface based on the target reference content.

14. The apparatus for displaying content on a same screen according to claim 11, wherein the processor executes the program instructions further to perform at least one of:

obtain the display content meeting the filtration condition from content cached locally by the terminal device; and receive the display content meeting the filtration condition from the server, and updating the content cached locally by the terminal device based on the received display content.

15. The apparatus for displaying content on a same screen according to claim 9, wherein the display content is a picture, and the processor executes the program instructions further to:

determine a compression ratio for the picture based on a data amount of the picture, a width and a height of the picture, and a ratio of a width and a height of a picture browsing frame, wherein the picture browsing frame is a region for displaying the picture in the floating region;

invoke a picture processing application program interface to compress the picture based on the compression ratio; and load the compressed picture to the picture browsing frame in the floating region for display.

16. The apparatus for displaying content on a same screen according to claim 15, wherein the processor executes the program instructions further to:

determine, when the picture is dragged, whether a position of the dragged picture reaches a boundary of the picture browsing frame, and prevent the picture from being dragged toward the boundary in a case that the position of the dragged picture reaches the boundary of the picture browsing frame.

17. The apparatus according to claim 9, wherein a display size of the floating region is customized, and the floating region is capable of being minimized and being dragged on the application interface to adjust a display position of the floating region.

\* \* \* \* \*